United States Patent
Roshanravan

(10) Patent No.: US 8,622,637 B2
(45) Date of Patent: Jan. 7, 2014

(54) EXTENDABLE-REACH IMAGING APPARATUS

(76) Inventor: Kambiz M. Roshanravan, Medina, WA (US)

( * ) Notice: Subject to any disclaimer, the term of this patent is extended or adjusted under 35 U.S.C. 154(b) by 91 days.

(21) Appl. No.: 13/426,029

(22) Filed: Mar. 21, 2012

(65) Prior Publication Data

US 2013/0250130 A1 Sep. 26, 2013

(51) Int. Cl.
*G03B 17/56* (2006.01)
(52) U.S. Cl.
CPC ...................................... *G03B 17/56* (2013.01)
USPC ......................................................... 396/428
(58) Field of Classification Search
USPC .......................................... 396/268, 274, 428
See application file for complete search history.

(56) References Cited

U.S. PATENT DOCUMENTS

| 6,774,948 | B1 * | 8/2004 | Inoue | 348/374 |
| 8,203,625 | B2 * | 6/2012 | Furuya et al. | 348/229.1 |
| 2009/0003822 | A1 * | 1/2009 | Tyner | 396/428 |

\* cited by examiner

*Primary Examiner* — William B. Perkey
(74) *Attorney, Agent, or Firm* — Ataullah Arjomand

(57) ABSTRACT

Disclosed are embodiments of an image acquisition apparatus with an extendable arm on which an image sensor is located and is easily manipulated to reach hard-to-reach places and transmit captured images to the user. In one embodiment, the combination of a telescopic sensor mount and an image sensor can be an integral part of or an add-on accessory for cell phones, cameras, iPads, iPods, etc. In another embodiment the apparatus may replace car radio antennas to serve as observation beacons in crowded and congested traffic. In different embodiments the orientation of the image sensor on its mount may be manually or remotely adjustable, while the image data gathered by the image sensor may be transmitted to the user by wire, wirelessly, or optically. In various embodiments a microphone and/or a flash may also be installed on the extendable mount.

16 Claims, 4 Drawing Sheets

EXTENDABLE-REACH IMAGING APPARATUS

CROSS-REFERENCE(S) TO RELATED APPLICATION(S)

None.

TECHNICAL FIELD

This application relates generally to a spatially flexible imaging apparatus and in particular to a video or a picture camera with an image sensor located on an extendable mount.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
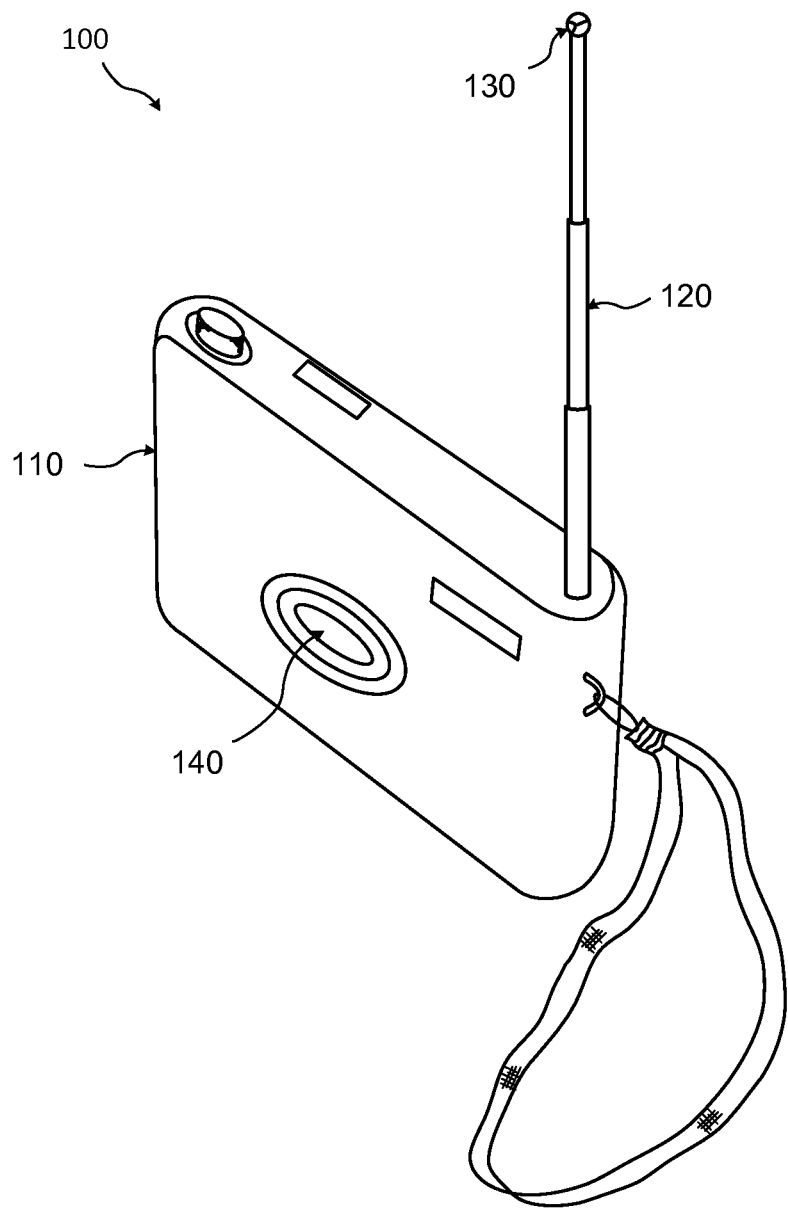
FIG. 1 shows an example camera with an extendable image sensor mount.

While the present disclosure is described with reference to several illustrative embodiments described herein, it should be clear that the present disclosure should not be limited to such embodiments. Therefore, while in the following description the disclosed apparatus is used in conjunction with some exemplary electronic devices, such as cell phones, and is used in some exemplary places and situations, such as in crowded places and traffic jams, it will be appreciated that the description of the embodiments provided herein is illustrative of the present disclosure and should not limit the scope of the disclosure as claimed.

Briefly described, embodiments of image capturing apparatus are disclosed that can take pictures or videos of hard-to-reach places and which overcome physical and spatial limitations imposed on the operators of customary cameras. Currently, one of the problems with the traditional cameras, cell phones, smartphones, and iPods is that the height of view is limited by the operator's body height and if a person wants to take a picture from an elevated height or a lower height, she should either climb on a chair or a ladder or sit on the ground to achieve her goal. Or a short person in a crowded place cannot see beyond a couple of feet around her. Another limiting problem of the contemporary cameras is that the users must face the object to obtain an image. A further limiting problem for the present camera user is the impossibility of photography when there is an object or obstacle in the line of sight of the user. The disclosed apparatus, as explained through exemplary embodiments, overcomes the above mentioned problems as well as presenting additional advantages to the professional and amateur photographers.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 show an exemplary camera assembly 100 that includes a camera 110 with a telescopic image sensor mount 120. In some embodiments the image sensor mount 120 is similar to a hollow telescopic antenna of a transistor radio, on tip of which an image sensor 130 is attached and through which the wires or optical fibers carry the image data. In various embodiments the image sensor mount 120 is any extendable-collapsible arm, of which the telescopic mount is just an example. In some embodiments of the image sensor mount 120, the attached image sensor 130 may be fixed to the tip of the image sensor mount 120, while in other embodiments the position of the image sensor 130 with respect to the image sensor mount 120 may be manually adjustable. In some embodiments, image sensor mount 120 is manually extendable, while in other embodiments, image sensor mount 120 is motorized.

In various embodiments the image data acquired by the image sensor 130 may be transmitted to the camera 110 by wire, wirelessly, optically, or by a combination thereof; the telescopic mount 120 may be an integral part of the camera 110 or be an accessory that can be attached and detached from the camera 110; the image sensor 130 may be in addition to or in lieu of the camera's traditional image sensor 140; the telescopic mount 120 may also be equipped with a flash and/or a microphone; or a combination of some or all the above enumerated options.

Those skilled in the art will appreciate that "camera" can be any electronic device or gadget configured to take, record, or transitionally transmit still or video pictures of any object, such as but not limited to a digital camera, a cell phone, a smartphone, an iPad, an iPod, computing tablets, and the like.

Figure 2:
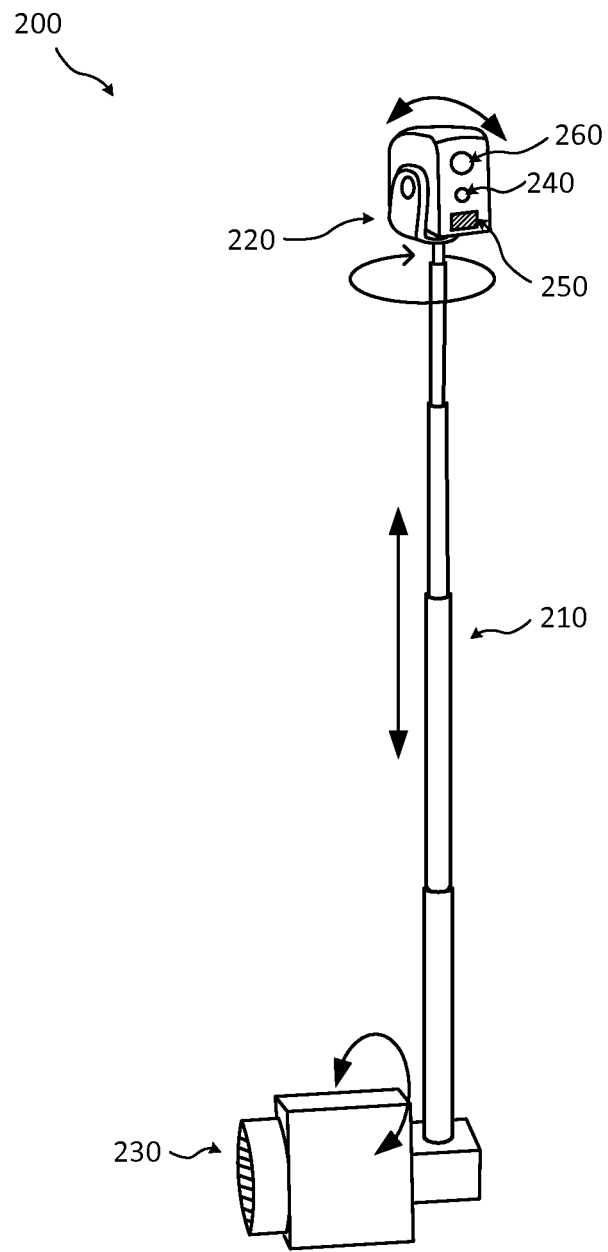
FIG. 2 shows an example telescopic image sensor mount having multiple degrees of freedom for adjustment of the orientation of the image sensor and configured to be attached to and detached from any electronic device or gadget with a USB or a similar port.

FIG. 2 shows exemplary image sensor mount assembly 200, including a telescopic image sensor mount 210 and an adjustable-coordinates image sensor combination 220 that includes lens/aperture 260, and has multiple degrees of freedom to allow direct manual or remote adjustment of the coordinates of the image sensor, and further configured to be attached to and detached from any electronic gadget with a USB or a similar port 230. In the illustrative embodiment 200, the adjustable-coordinates image sensor combination 220 also includes a microphone 240 and a flash 250.

Those skilled in the art will appreciate that many other types of miniature image sensor combination 220 are possible without departing from the spirit of the present disclosures. For example, all or some of electronic circuitry associated with different functionalities of the image sensor combination 220 may be housed in image sensor combination 220, instead of being housed in the electronic device to which the image sensor mount assembly 200 is attached.

Figure 3:
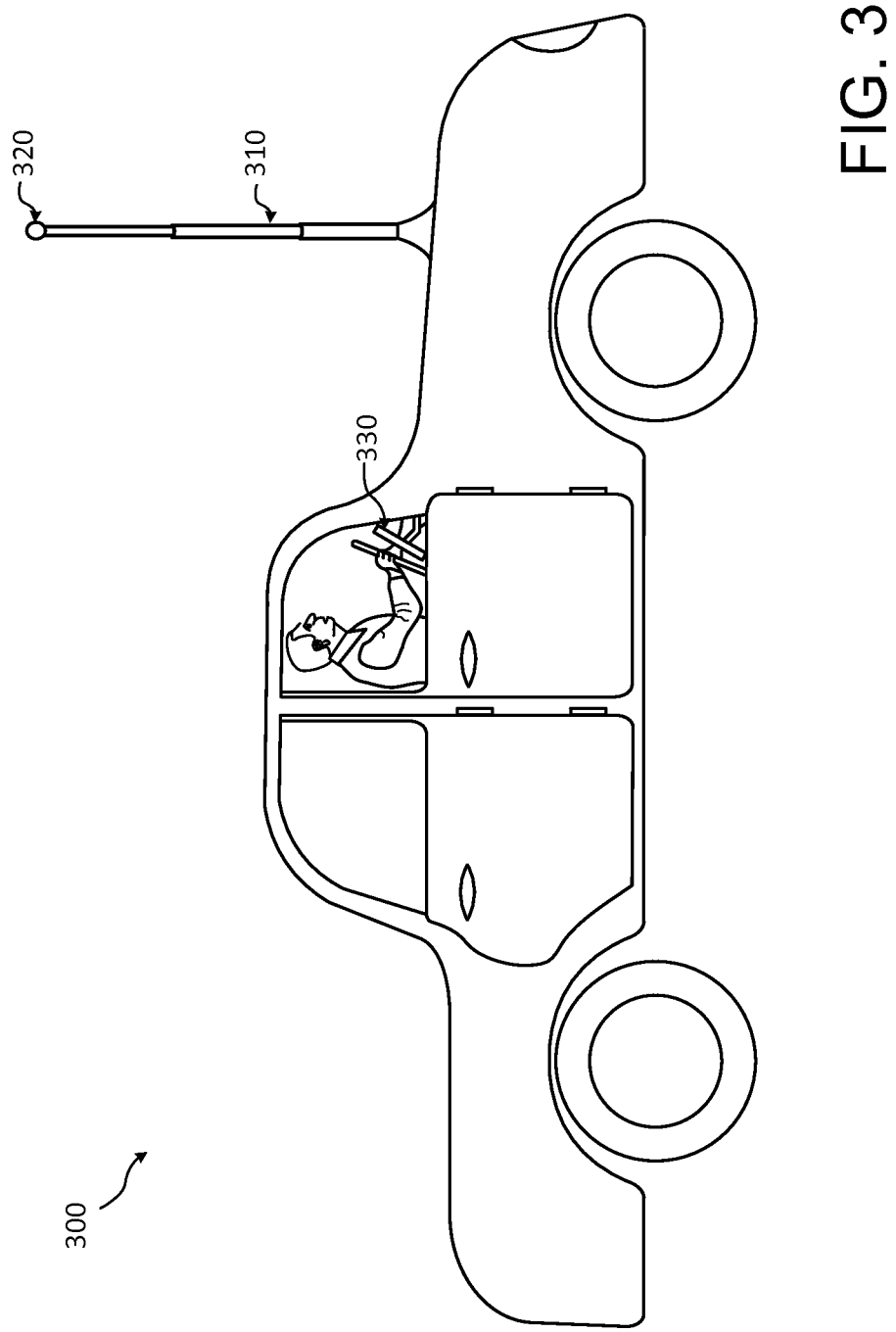
FIG. 3 shows an example telescopic image sensor mount employed to replace a car antenna, wherein the image sensor height and viewing direction are controlled by the car driver.

FIG. 3 shows an exemplary automobile imaging assembly 300, which includes a telescopic image sensor mount 310 as a replacement for the car antenna or used in addition to the car antenna, and wherein an image sensor 320 is mounted on the free end of the telescopic image sensor mount 310. The height and viewing direction of the image sensor 320 may be controlled by the car driver. In various embodiments an electronic display 330 may be installed in front of the driver so that the driver can take pictures or see video images taken by the image sensor 320. Such apparatus is useful in traffic jams and congested traffic, by which the driver can view her surrounding much farther than her usual field of view and can determine her next moves. Driver can also use the imaging assembly to assist her while parking the car and to view her blindspot while driving. It can also be used to take pictures and videos of scenic routes with 360 degrees field of view. Such arrangement may also be used to see behind the car as a rear-view device when backing up.

Figure 4:
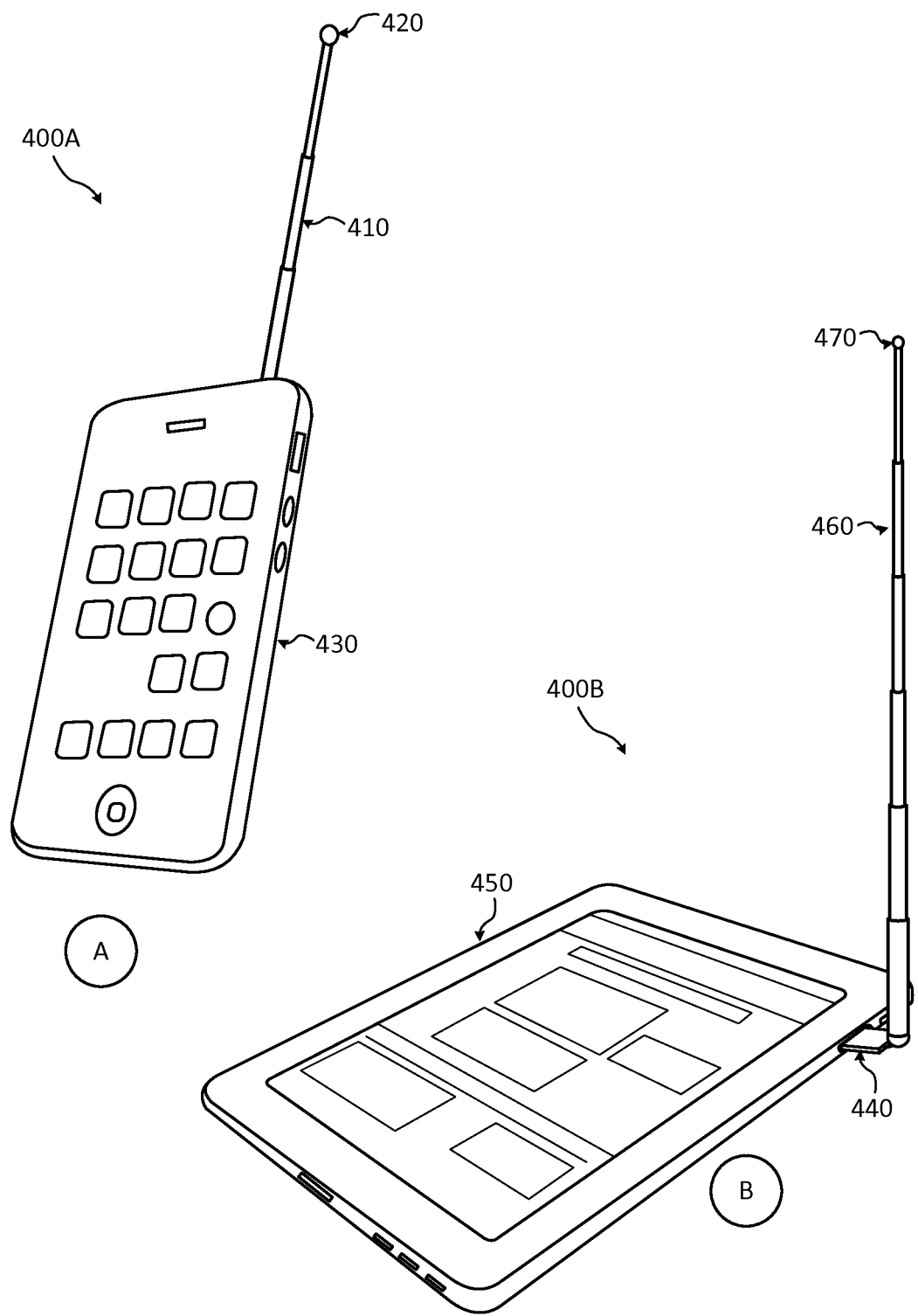
FIGS. 4A and 4B show examples of a cell phone with a built-in extendable image sensor mount and a tablet computing device with an extendable image sensor mount as an accessory.

FIGS. 4A and 4B show examples of a cell phone assembly 400A, including a cell phone 430, an image sensor mount 410 at the end of which an image sensor 420 is attached; and a tablet computing device, such as an iPad assembly 400B, including an iPad 450 and an image sensor mount 460 at the end of which an image sensor 470 is attached, wherein telescopic image sensor mount 460 is connected to iPad 450 via a USB or other types of electrical or optical interfaces 440, such as IEEE 1394 Firewire, HDMI (High Definition Media Interface), and the like. In various embodiments the image sensor mount 410 or 460 may be either manually positioned and oriented or remotely repositioned and oriented through the electronic device to which they are connected, or both. In some embodiments the electronic devices, to which the image sensor mounts 410 are connected, may have a viewing screen through which the live image of the scene can be viewed.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. An extendable image acquisition apparatus comprising:
   an image sensor;
   a general purpose electrical or optical connector that is not customized to connect to any specific image acquisition device; and
   an extendable mount coupled with the image sensor and with the general purpose connector, wherein a distance between the image sensor and the general purpose connector is set by extending or contracting the extendable mount and wherein the image sensor is electrically, optically, or wirelessly in communication with the general purpose connector.

2. The apparatus of claim 1, wherein the image data is transmitted from the image sensor to the electronic device by wire, wirelessly, optically, or by a combination thereof.

3. The apparatus of claim 1, wherein the image sensor also includes a microphone, a flash, or both.

4. The apparatus of claim 1, wherein the image sensor also includes at least a part of image processing circuitry.

5. The apparatus of claim 1, wherein the position and/or the coordinates of the image sensor is adjusted manually and/or remotely.

6. The apparatus of claim 1, wherein the extendable mount is telescopic.

7. The apparatus of claim 1, wherein the general purpose connector is a USB connector, an IEEE 1394 Firewire, or HDMI (High Definition Media interface).

8. An extendable image sensor mount comprising:
an image sensor;
an extendable-collapsible mount coupled with the image sensor; and
a general purpose electrical and/or optical connector that is not custom built for connecting to any specific device and that is electrically and/or optically and/or wirelessly coupled with the image sensor and is also attached to the extendable-collapsible mount, wherein the general purpose connector is used to connect the extendable image sensor mount to any electronic device with compatible port and transmit image data from the image sensor to the electronic device electrically, optically, wirelessly, or a combination thereof.

9. The apparatus of claim 8, wherein the extendable-collapsible mount is telescopic.

10. The apparatus of claim 8, wherein the image sensor also includes a microphone, a flash, or both.

11. The apparatus of claim 8, wherein the image sensor also includes at least a part of image processing circuitry.

12. The apparatus of claim 8, wherein the general purpose connector is a USB connector, an IEEE 1394 Firewire, or HDMI.

13. The apparatus of claim 8, wherein the extendable-collapsible mount or a part thereof, is flexible or rigid.

14. The apparatus of claim 8, wherein the image sensor has zero degrees of freedom with respect to the part of the extendable-collapsible mount to which the image sensor is attached or has at least one degree of freedom with respect to the part of the extendable-collapsible mount to which the image sensor is attached.

15. The apparatus of claim 8, wherein the image sensor is fiber optic ends.

16. The apparatus of claim 8, wherein the image sensor includes a lens.

* * * * *